United States Patent

Cowley

[11] Patent Number: 5,819,865
[45] Date of Patent: Oct. 13, 1998

[54] SKATEBOARD TYPE VEHICLE

[76] Inventor: Graham Ross Cowley, 5 Hurlestone Avenue, Preston, Victoria, Australia, 3072

[21] Appl. No.: 537,669

[22] PCT Filed: Apr. 18, 1994

[86] PCT No.: PCT/AU94/00199

§ 371 Date: Oct. 16, 1995

§ 102(e) Date: Oct. 16, 1995

[87] PCT Pub. No.: WO94/23810

PCT Pub. Date: Oct. 27, 1994

[30] Foreign Application Priority Data

Apr. 16, 1993 [AU] Australia ............................. PL 8309

[51] Int. Cl.⁶ .................................................. A63C 5/08
[52] U.S. Cl. ........................ 180/181; 180/185; 180/190; 280/87.042; 280/126; 280/714; 280/102
[58] Field of Search ................................. 180/180, 181, 180/183, 186, 185, 190; 280/87.042, 688, 109, 126, 91.1, 99, 7.14, 7.13, 87.01, 102

[56] References Cited

U.S. PATENT DOCUMENTS

| | | | |
|---|---|---|---|
| 1,215,528 | 2/1917 | Hebbeler | 280/102 |
| 3,290,058 | 12/1966 | Ellerd | 280/410 |
| 4,073,356 | 2/1978 | Schlict . | |
| 4,098,519 | 7/1978 | Reid, Jr. | 280/87.01 |
| 4,143,728 | 3/1979 | Shiber | 180/181 |
| 4,151,892 | 5/1979 | Francken | 180/181 |
| 4,230,330 | 10/1980 | Muhammad . | |
| 4,307,788 | 12/1981 | Shelton | 180/181 |
| 4,645,223 | 2/1987 | Grossman . | |
| 4,896,893 | 1/1990 | Shumays et al. | 280/7.14 |
| 5,020,621 | 6/1991 | Martin | 180/181 |
| 5,114,166 | 5/1992 | McCosker . | |

FOREIGN PATENT DOCUMENTS

| | | |
|---|---|---|
| 2661107 | 10/1991 | France . |
| 2666780 | 3/1992 | France . |
| 661300 | 11/1951 | United Kingdom . |

*Primary Examiner*—Brian L Johnson
*Assistant Examiner*—Avraham Lerner
*Attorney, Agent, or Firm*—Richard M. Goldberg

[57] ABSTRACT

A light transport vehicle (10) which is directly steerable by a person or persons standing on the vehicle, which vehicle includes (a) an elongated, flexible platform (11); (b) a leading two-part carriage (20) and a trailing two-part carriage (30) slung to the underside of the platform; (c) a set of wheels or rollers (14, 15, 16, 17) rotatably attached to each of the two-part carriages; and (d) two diagonally-located struts (25, 26) attached to and joining outer, laterally opposing ends (27, 28, 37, 38) of the two-part carriages. Each two-part carriage includes two parallel, laterally-extending suspension members (21, 22, 31, 32).

15 Claims, 5 Drawing Sheets

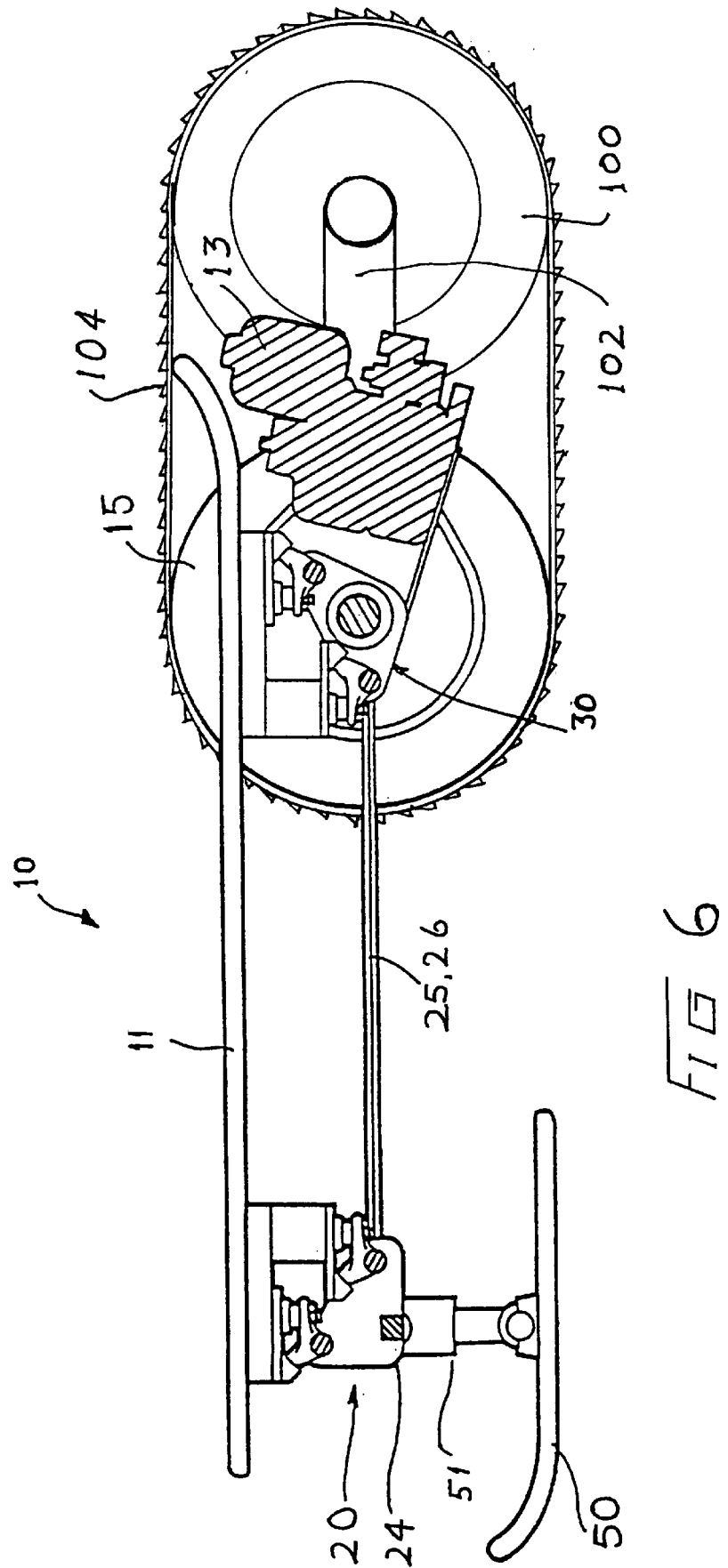

5,819,865

SKATEBOARD TYPE VEHICLE

FIELD OF THE INVENTION

This invention relates to a light transport vehicle which is directly steerable by a person or persons standing on a platform forming part of the vehicle.

BACKGROUND OF THE INVENTION

Skateboards have been in common use since the 1970s. The commonly used construction of a skateboard involves the use of an elongated, flexible platform. A leading set and a trailing set of wheels or rollers are suspended below the platform. Each suspension point uses a laterally disposed carriage for the set of wheels or rollers, the suspension being attached to the underside of the platform The carriage is so constructed that each component of the set of wheels or rollers is separated to a substantial degree. The carriage is usually referred to as a "truck".

A conventional skateboard is steered by standing on one side or the other of the flexible platform which flexes to one side or the other. This flexion produces tension on the connectors attaching the trucks to the flexible platform causing the sets of wheels or rollers to turn and hence the skateboard as a whole to turn.

An object of the present invention is to provide a light transport vehicle which uses certain of the operating principles of skateboards and applies them to a more heavy duty transport vehicle.

It is a further object to provide such a light transport vehicle which may be motorised.

It is yet a further object to provide such a light transport vehicle which can travel over a considerable variety of terrains.

BRIEF SUMMARY OF THE INVENTION

This invention, therefore, provides a light transport vehicle which is directly steerable by a person or persons standing on the vehicle, which vehicle comprises:

(a) an elongated, flexible platform;

(b) a leading two-part carriage and a trailing two-part carriage slung to the underside of the platform;

(c) a set of wheels or rollers rotatably attached to each of the two-part carriages; and (d) two diagonally-located struts attached to and joining outer, laterally opposing ends of the two-part carriages, wherein each two-part carriage comprises two parallel, laterally-extending suspension means.

BRIEF DESCRIPTION OF THE DRAWINGS

The drawings illustrate one embodiment of the invention in which:

FIG. 6 is a cross-sectional view similar to FIG. 5 with the addition of an extra set of wheels and traction belts.

DETAILED DESCRIPTION OF THE INVENTION

The elongated, flexible platform is preferably a relatively long narrow structure. It is preferably constructed from a laminated material such as plywood or a composite material containing carbon or glass fibres.

It is preferred to use a set of wheels, preferably relatively squat pneumatic wheels such as those used for competition vehicles such as go-karts.

It is possible to replace each member of the leading set of wheels by short ski means. In addition it is possible to assist the grip of the vehicle on the trailing surface by providing a third set of wheels to the rear of the vehicle and, if desired, coupling corresponding wheels of this third set to the trailing set using traction belts which travel over the surface of the travelling surface. This modification is suitable for snow surfaces, for example.

The struts are so constructed from suitable material and are of suitable dimensions so as to be rigid but relatively light. Suitable materials are steel or carbon fibre-based composites. The struts may be attached via flexible attachment means.

Each two-part carriage may comprise two suspension means which are joined together at one or more regions. Alternatively the two suspension means are integral with the remainder of the twopart carriage.

Preferably each suspension means in a two-part carriage is attached to the underside of the platform and each suspension means is joined to the other suspension means by bracket means.

Preferably the vehicle is driven by a small motor coupled to the set of rear wheels by means of gears or a variable belt drive.

Figure 1:
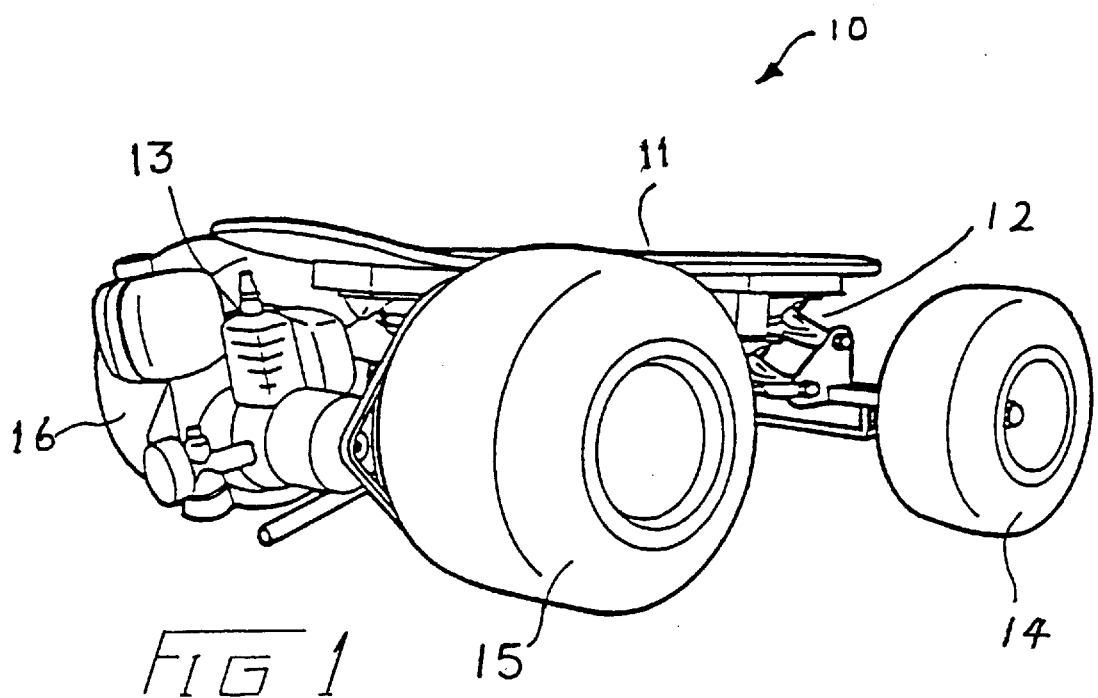
FIG. 1 is an isometric view from the rear right of a light transport vehicle according to the invention.
Figure 2:
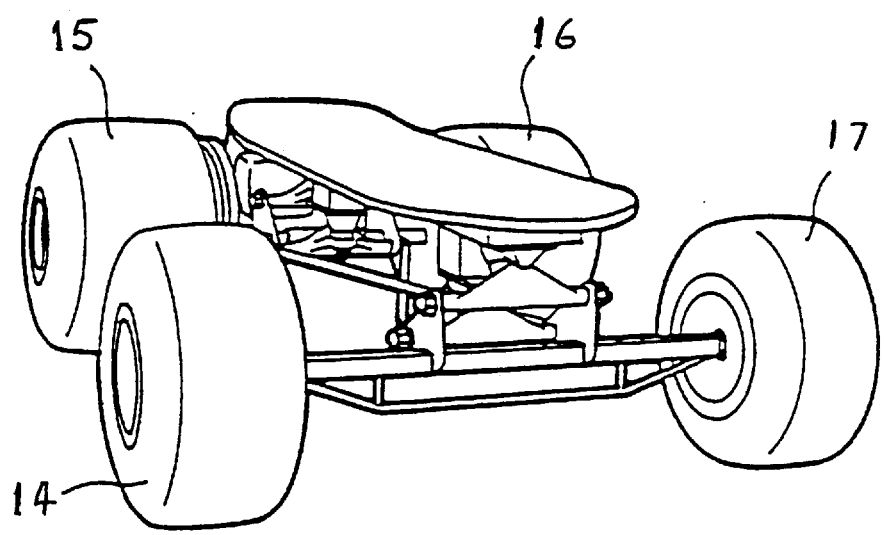
FIG. 2 is an isometric view from the front right of the vehicle of FIG. 1.

Turning to the accompanying drawings, in FIGS. 1 and 2 a light transport vehicle 10 comprises an elongated, flexible platform 11 supported by an undercarriage 12. A motor 13 is mounted on the rear of the undercarriage 12 and the whole vehicle is supported on wheels 14, 15, 16 and 17. Wheels 14 and 17 are relatively small front wheels and 15 and 16 are relatively large rear wheels.

Figure 3:
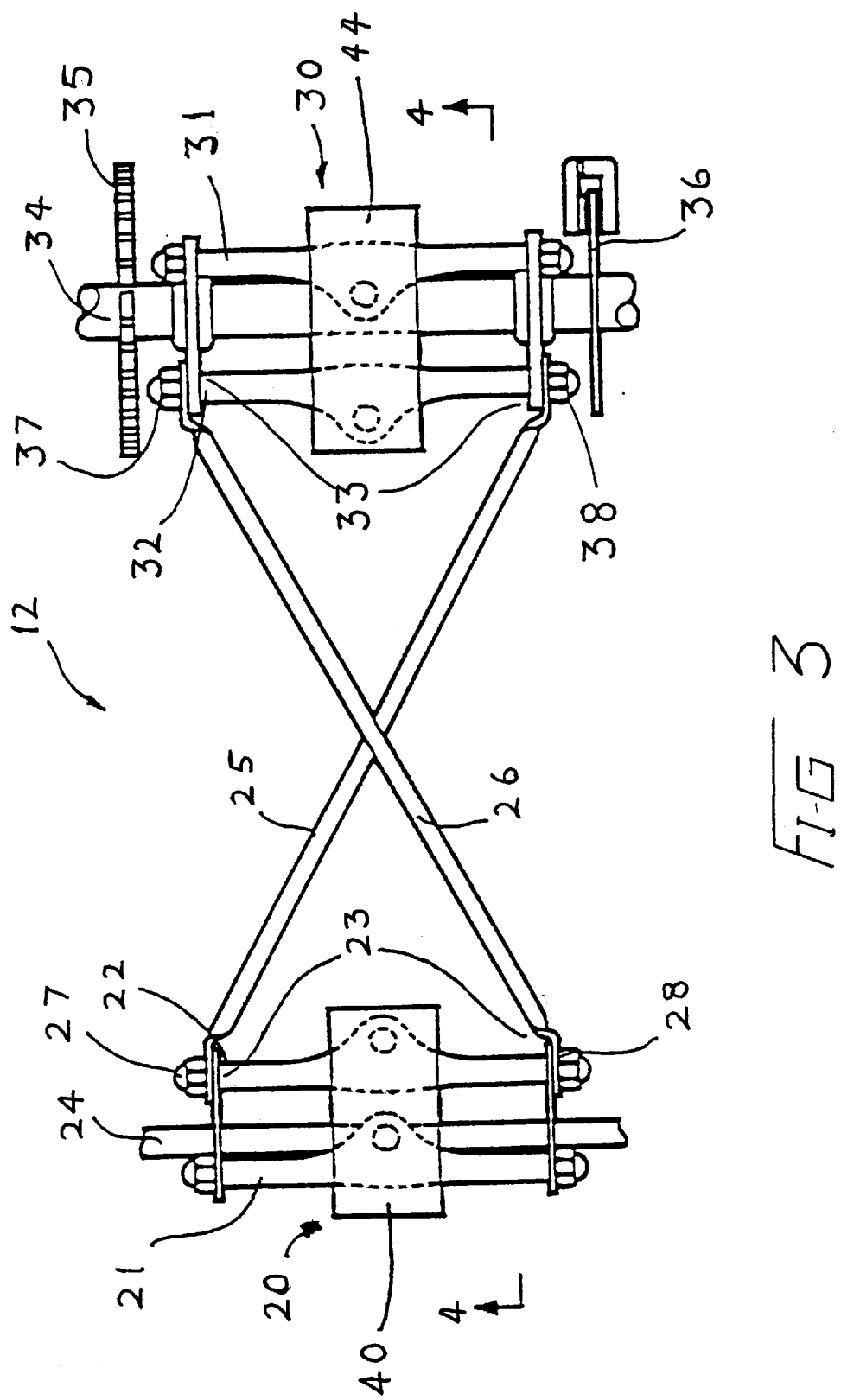
FIG. 3 is a plan view from the top of a portion of the suspension and support structures forming part of the vehicle.
Figure 4:
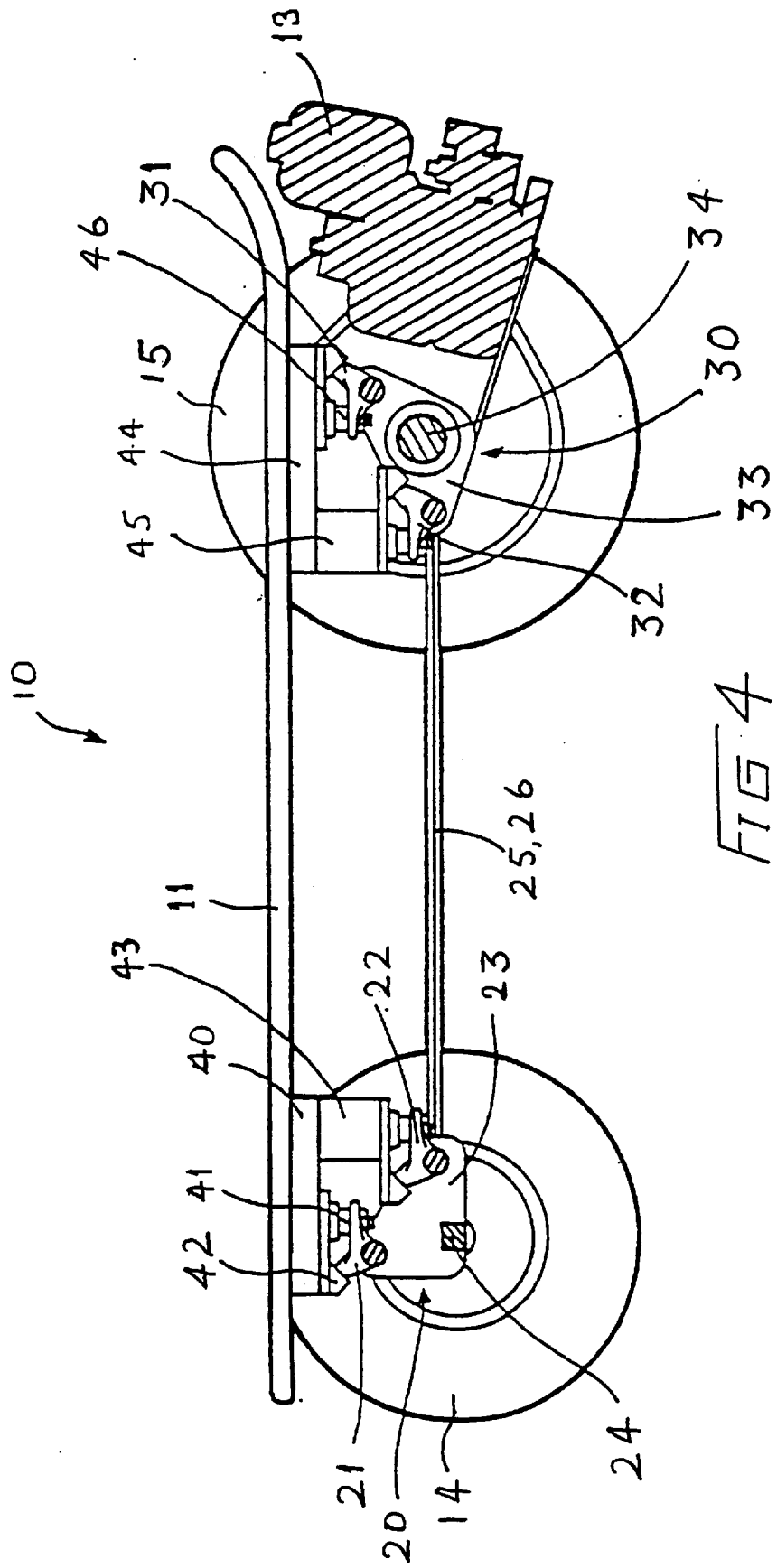
FIG. 4 is a cross-sectional view along line 4—4 shown in FIG. 3.

Considering FIGS. 3 and 4, undercarriage 12 comprises a leading two-part carriage 20 positioned laterally across the underside of the front of the platform 11; see FIG. 1. Carriage 20 comprises two parallel, elongate suspension means 21 and 22 joined by a first bracket means 23. First bracket means 23 is mounted on transverse tube 24. Diagonal struts 25 and 26 are linked to ends 27 and 28 respectively of suspension means 22.

Numeral 30 indicates a trailing two-part carriage and numerals 31 and 32 two parallel suspension means similar to suspension means 21 and 22. Suspension means 31 and 32 are joined by second bracket means 33. Carriage 30 is mounted on transverse axle 34.

Carriage 20 is mounted by way of suspension means 21 and 22 upon front block 40 which is attached to the forward part of the underside of platform 11. Carriage 21 is attached to the underside of first block 40 by means of a first nut, bolt and bush means 41 penetrating one wing of suspension means 21. Another wing of suspension means 21 extends into a guide 42 also attached to the underside of first block 40. A similar arrangement is provided to attach suspension means 22 to first block 40 except that, since suspension means 22 is positioned lower than suspension means 21, a first extension piece 43 is provided between first block 40 and suspension means 22.

In a similar manner carriage 30 is mounted by way of suspension means 31 and 32 upon second block 44. A second extension piece 45 extends downwards from second block 44 to provide part of the attachment for carriage means 30. A second nut, bolt and bush means 46 forms the other principal part of the attachment for carriage means 30.

A sprocket gear 35 is shown near one end of axle 34 and a disc brake 36 at the other end of axle 34. Thus motor 13 couples to axle 34 through gear 35.

Numerals 37 and 38 indicate the points of attachment of struts 26 and 25 respectively to suspension means 32.

Figure 5:
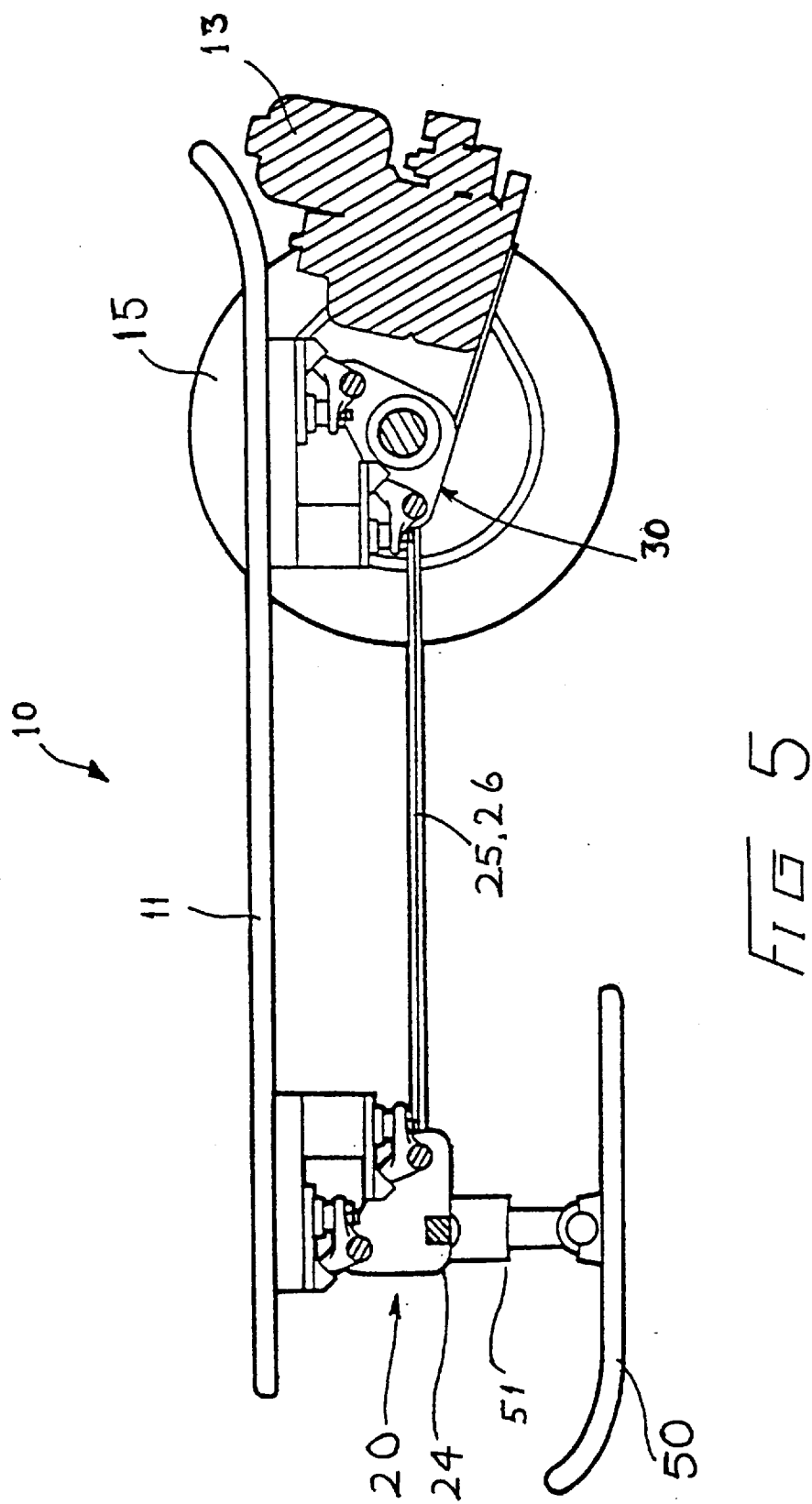
FIG. 5 is a cross-sectional view similar to FIG. 4 except that the leading wheel shown in FIG. 4 is replaced by a small ski means.

Turning now to FIG. 5, both front wheels may be replaced by short ski means—one ski means 50 only is shown. A suspension column 51 joins ski means 50 to transverse tube 24.

It is possible to provide structure on the platform to assist a person or persons to ride on the vehicle and carry items of equipment, for example, golf clubs.

It is possible in the case of the ski version to provide a third set of wheels 100 located to the rear of the trailing set of wheels 15, 16 for the purpose of providing extra grip. Wheels 100 are mounted by support bars 102 to axle 34. The extra grip wheels may be coupled to the trailing set of wheels 15, 16 by means of traction belts.

One purpose of diagonal struts 25 and 26 is to provide greater rigidity to the structure of the vehicle as a whole. In the absence of the struts platform 11 would tend to bow to an unacceptable degree. However, the platform 11 may still flex to some extent to one side or the other and the wheels of each set of wheels may turn correspondingly as in a conventional skateboard. Furthermore, linking provides four-wheel steering and stability. This effect is not dependent upon the standing position(s) adopted by the person(s) on the platform.

The purpose of the two-part carriages 20 and 30 is to provide more effective load distribution and transmission than is the case in a simple "truck" used to suspend wheels or rollers in a conventional skateboard.

In the drawings the trailing set of wheels is illustrated in such a manner that the wheels project above a plane through the upper surface of the platform. It is preferred that these wheels do not extend above this plane for ease of riding on the platform

I claim:

1. A skateboard-type light transport vehicle which can be ridden by a user and which is directly steerable by weight transfer of a person or persons standing on the vehicle, which vehicle comprises:
   (a) an elongated, flexible platform;
   (b) a leading two-part carriage and a trailing two-part carriage attached to the underside of the platform, each two-part carriage comprising two parallel, laterally extending suspension members joined together at at least one region;
   (c) a first pair of wheels rotatably attached to the trailing two-part carriage and a second pair of wheels attached to the leading two-part carriage; and
   (d) two diagonally-located struts attached to and joining outer, laterally opposing ends of the two-part carriages, wherein opposite ends of the struts which are attached to the opposing ends of the two-part carriage form flexible attachments.

2. A vehicle as claimed in claim 1, wherein the platform is a long narrow structure having a length and a width, with the length thereof much greater than the width.

3. A vehicle as claimed in claim 2, wherein the platform is constructed from laminated material.

4. A vehicle as claimed in claim 1, wherein the wheels are squat pneumatic wheels.

5. A vehicle as claimed in claim 1, wherein the suspension members forming part of each two-part carriage are integral with a remainder of the carriage.

6. A vehicle as claimed in claim 5, wherein each suspension member in each two-part carriage is attached to the underside of the platform, and further comprising bracket means for joining each suspension member to the other suspension member.

7. A vehicle as claimed in claim 1 wherein each suspension member in each two-part carriage is attached to the underside of the platform, and further comprising bracket means for joining each suspension member to the other suspension member.

8. A vehicle as claimed in claim 1, wherein a small motor is coupled to the first pair of wheels attached to the trailing two-part carriage, by means of a gear.

9. A vehicle as claimed in claim 1, further comprising:
   a rear axle mounted to the trailing two-part carriage, with the first pair of wheels mounted on the rear axle;
   a motor mounted to the trailing two-part carriage; and
   a drive connection for drivingly coupling the motor to the rear axle to rotate the first pair of wheels.

10. A vehicle as claimed in claim 1, wherein the two suspension members of each carriage are separately and independently secured to said platform at different positions.

11. A skateboard-type light transport vehicle which can be ridden by a user and which is directly steerable by weight transfer of a person or persons standing on the vehicle, which vehicle comprises:
    (a) an elongated, flexible platform;
    (b) a leading two-part carriage and a trailing two-part carriage attached to the underside of the platform, each two-part carriage comprising two parallel, laterally extending suspension members joined together at at least one region, wherein the two suspension members of each carriage are separately and independently secured to said platform at different positions, and wherein one suspension member of each carriage is positioned lower than the other suspension member of the respective carriage;
    (c) a pair of wheels rotatably attached to the trailing two-part carriage;
    (d) ski members attached to the leading two-part carriage; and
    (e) two diagonally-located struts attached to and joining outer, laterally opposing ends of the two-part carriages.

12. A vehicle as claimed in claim 11, wherein gripping of a travelling surface is assisted by an extra rear pair of wheels.

13. A vehicle as claimed in claim 12, wherein at least one traction belt extends around the wheels attached to the trailing two-part carriage and the extra rear pair of wheels.

14. A vehicle as claimed in claim 11, further comprising:
    a rear axle mounted to the trailing two-part carriage, with the pair of wheels mounted on the rear axle;
    a motor mounted to the trailing two-part carriage; and
    a drive connection for drivingly coupling the motor to the rear axle to rotate the pair of wheels.

15. A skateboard-type light transport vehicle which can be ridden by a user and which is directly steerable by weight transfer of a person or persons standing on the vehicle, which vehicle comprises:

(a) an elongated, flexible platform;

(b) a leading two-part carriage and a trailing two-part carriage attached to the underside of the platform, each two-part carriage comprising two parallel, laterally extending suspension members joined together at at least one region, wherein the two suspension members of each carriage are separately and independently secured to said platform at different positions, and wherein one suspension member of each carriage is positioned lower than the other suspension member of the respective carriage;

(c) a first pair of wheels rotatably attached to the trailing two-part carriage and a second pair of wheels attached to the leading two-part carriage; and (d) two diagonally-located struts attached to and joining outer, laterally opposing ends of the two-part carriages.

* * * * *